Dec. 26, 1967 A. LATHAM, JR 3,359,910
APPARATUS FOR PROGRAMMING FLUID FLOW
Filed June 10, 1965 3 Sheets-Sheet 1

INVENTOR.
Allen Latham, Jr.
BY
Attorney

INVENTOR.
Allen Latham, Jr.

Dec. 26, 1967   A. LATHAM, JR   3,359,910
APPARATUS FOR PROGRAMMING FLUID FLOW
Filed June 10, 1965   3 Sheets-Sheet 3

INVENTOR.
Allen Latham, Jr.
BY
Attorney

United States Patent Office 3,359,910
Patented Dec. 26, 1967

3,359,910
APPARATUS FOR PROGRAMMING FLUID FLOW
Allen Latham, Jr., Jamaica Plain, Mass., assignor to Arthur D. Little, Inc., Cambridge, Mass., a corporation of Massachusetts
Filed June 10, 1965, Ser. No. 462,928
1 Claim. (Cl. 103—6)

ABSTRACT OF THE DISCLOSURE

A device for controlling the flow and composition of a fluid mixture and particularly a device which permits the programming of fluid flow in a manner to vary the rate and composition with respect to the fluid components making up the mixture. Pumping is accomplished through the use of pressure on flexible tubing sections, and the ratios of fluids pumped are controlled by controlling the cross sections of the tubing sections. Predetermined programs are readily interchangeable.

---

In many operations requiring the delivery of a fluid it is necessary constantly to meter the flow of the fluid and to regulate its composition within very narrow tolerances. It is also necessary in some of these operations to continuously or periodically change the composition of the fluid. With continuous change in composition it is, of course, possible to provide a fluid stream the composition of which can be made to represent a gradient over an entire spectrum of compositions.

As one example of the need for controlling the flow and composition of a liquid solution, there may be cited the case of liquid used to glycerolize and deglycerolize red blood cells. In the separation of red blood cells from blood which is fractionated for storage and subsequent restoration for transfusions, it is necessary to preserve the red blood cells in a glycerol medium. In the glycerolization of the red blood cells it is necessary gradually to alter the liquid composition in which the cells are suspended from the composition of the original plasma to a high concentration of glycerol; and in deglycerolization this order is reversed, that is, the liquid composition is changed from dilute glycerol to a suitable saline liquid. Thus it is necessary to be able to provide liquids of varying composition in both of these steps. It is also necessary of course to be able to do this in a completely sterile regime.

As another example of the need for controlling the flow and composition of a fluid mixture there may be cited the requirement for a liquid having a continuously changing composition in analytical work. Finally there are a number of industrial applications for such a device where fluid reactant compositions must be metered and their composition programmed over a given period.

In the fluid controlling apparatus of this invention, fluid is drawn from two or more reservoirs and introduced at a predetermined programmed rate (varying from zero to maximum) into a manifold and then into a fluid mixer. The apparatus is so designed that the components which control composition and flow rate can be readily replaced to achieve any desired programming. Such replacement is accomplished without disrupting the requirement for a sterile regime, if this is necessary.

It is therefore a primary object of this invention to provide a method and apparatus for accurately controlling the flow rate and composition of a fluid. It is another object of this invention to provide such an apparatus which permits the ready substitution of one rate-composition program for another. It is another primary object of this invention to provide apparatus capable of controlling the flow and composition of fluids in a sterile regime thus making it particularly suitable for use in glycerolization and deglycerolization of red bloods cells. It is yet another object of this invention to provide an apparatus which is capable of furnishing a fluid stream the composition of which exhibits a predetermined composition gradient. Other objects of the invention will in part be obvious and will in part be apparent hereinafter.

The invention accordingly comprises the several steps and the relation of one or more of such steps with respect to each of the others, and the apparatus embodying features of construction, combination of elements and arrangements of parts which are adapted to effect such steps all as exemplified in the following detailed disclosure, and the scope of the invention will be indicated in the claim.

For a fuller understanding of the nature and objects of the invention reference should be had to the following detailed description taken in connection with the accompanying drawings in which FIG. 1 is a schematic diagram illustrating the components of the apparatus of this invention;

Figure 1:
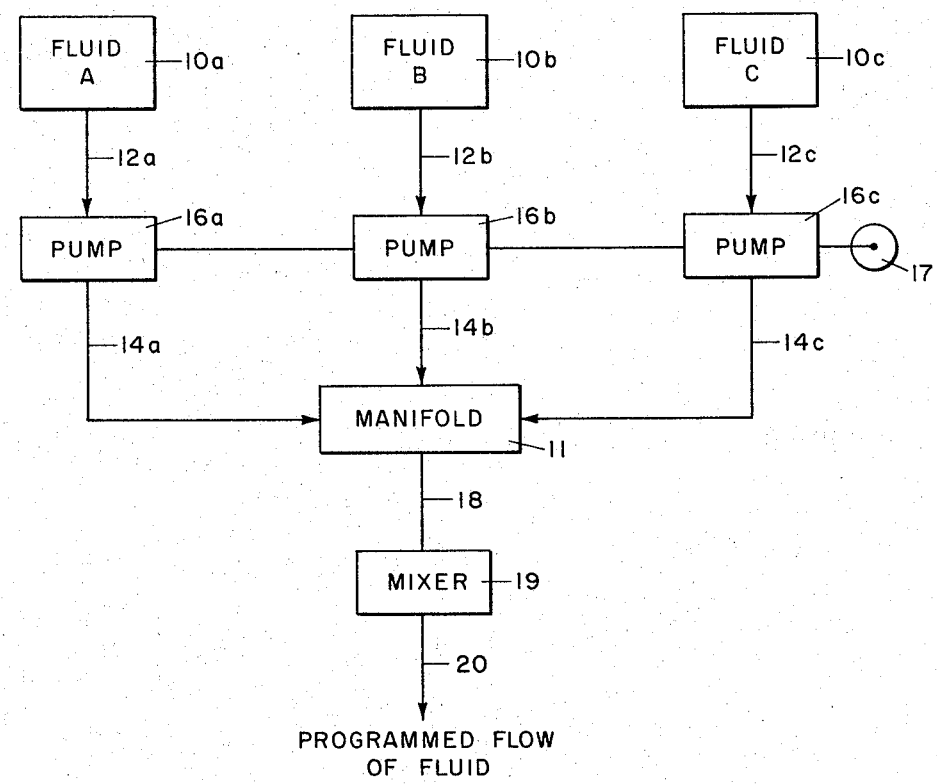

In the fluid flow device of this invention the various fluid components are supplied from separate fluid reservoirs through elastomeric tubings to a manifold and mixer. The manner in which programmed flow of fluids is achieved is illustrated diagrammatically in FIG. 1. Fluids A, B and C are introduced by gravity feed from their respective reservoirs $10a$, $10b$ and $10c$ into respective intake tubings $12a$, $12b$, and $12c$ and, subsequent to pumping, into outlet tubings $14a$, $14b$ and $14c$ which are in fluid communication with a manifold 11. The pumps $16a$, $16b$ and $16c$, which are the fluid flow control devices of this invention, achieve the programming of fluid flow through the coordination and programming of inlet and outlet valves and a predetermined programming of the displacement volume for each of the fluids being pumped. Both of these functions of the pump, i.e., the actuation of the inlet and outlet valves and the controlling of the displacement volume are achieved through the application of external forces on the elastomeric tubing. The tubing used has the property of returning to its original cross-sectional configuration once such external forces are removed. The manner in which these controls are effected will be apparent from the following detailed description.

Figure 2:
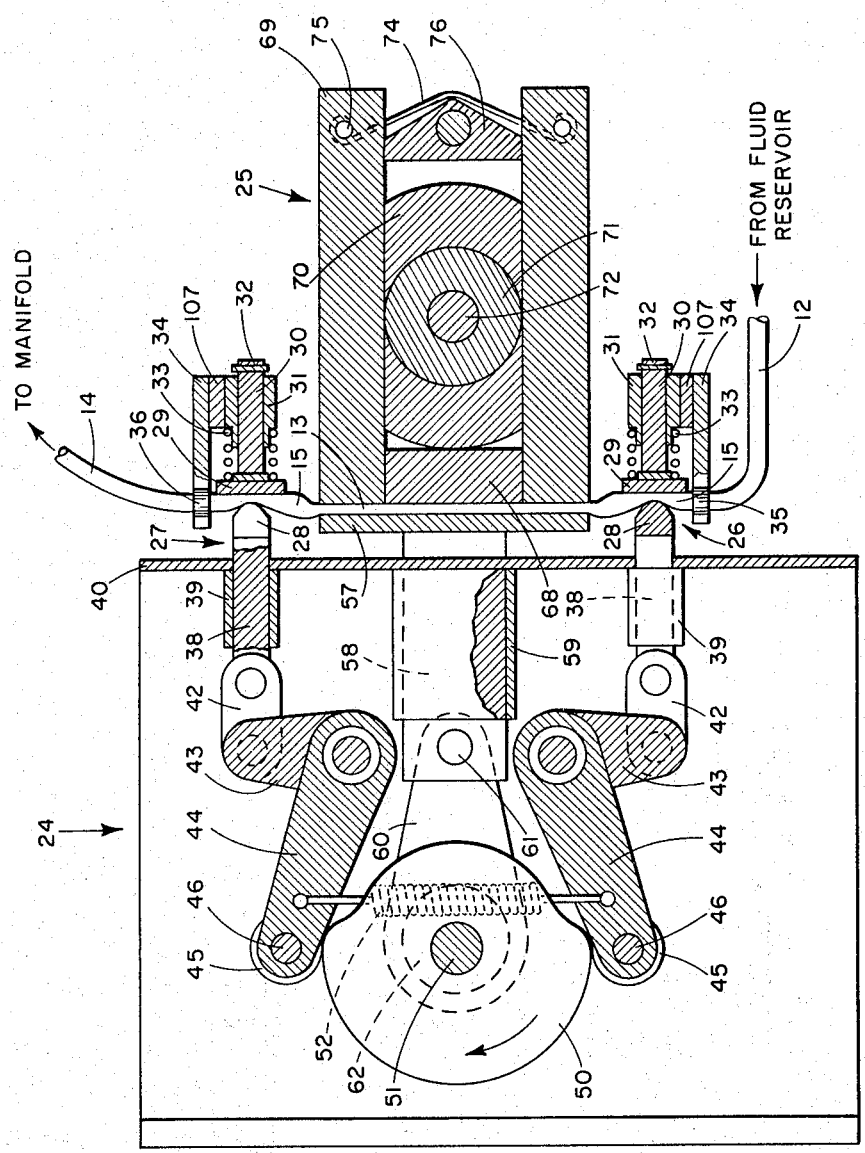
FIG. 2 is a side elevational view, partly in cross-section, taken along line 2—2 of FIG. 3.
Figure 3:
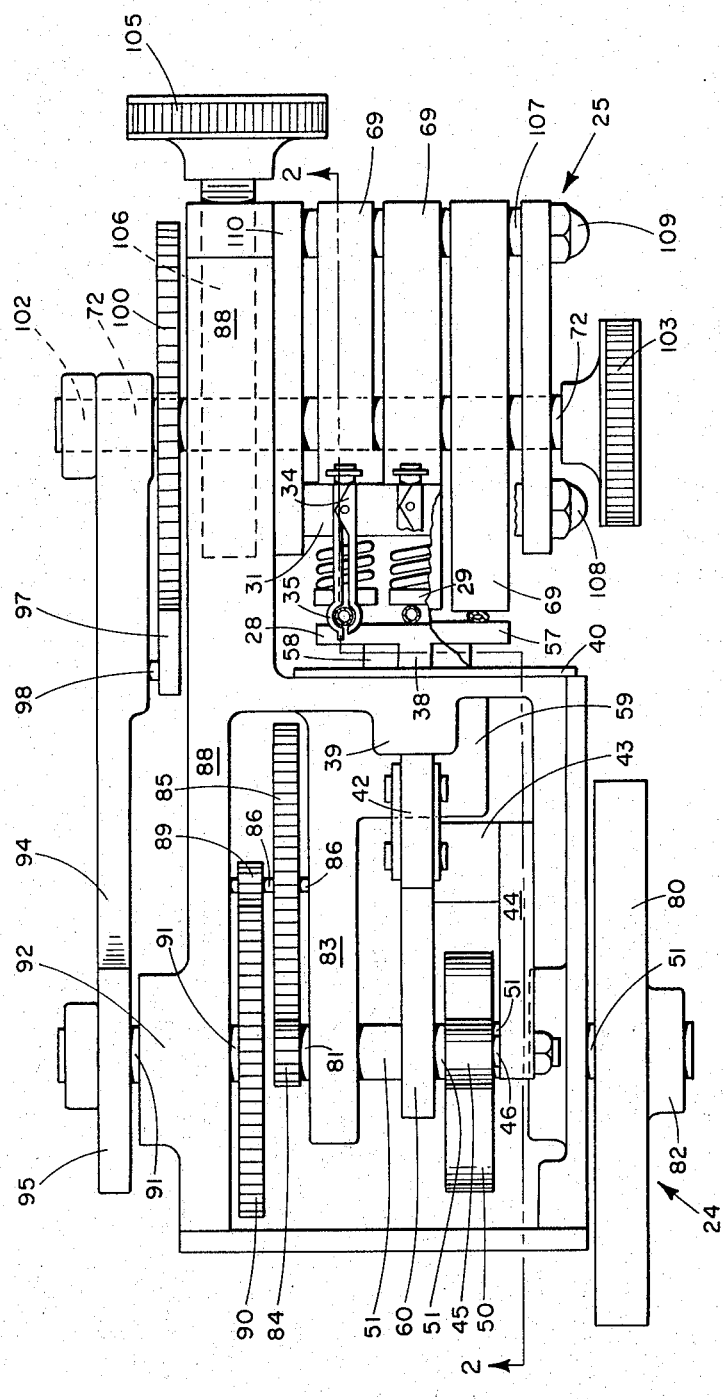
FIG. 3 is a top elevational view of the apparatus.

The device may be considered to be formed of two primary components i.e., a valve and pump actuation programming component 24 and a volume displacement programming component 25. Turning now to FIGS. 2 and 3 it will be seen that there are provided an inlet valve generally indicated at 26 and an outlet valve generally indicated at 27. These valves function through the application of sufficient pressure at points in tubing section 13 to shut off fluid flow within the tube. The valves are identical in structure and operation except that of course the outlet valve is closed when the inlet valve is open to permit liquid to flow into tubing section 13; and the inlet valve is closed when the outlet valve is open to discharge fluid from the tubing section 13. Each of these valves is comprised of a force-applying bar 28. This bar has a rounded surface to prevent cutting the tubing surface as its acts as a valve plunger. It will be appreciated from the top plan view of FIG. 3 that the valve bar 28 functions to apply and release pressure against three tube sections 13 corresponding to the three tubes through which fluids A, B and C flow. It is, of course, within the scope of this invention to use any number of these tubes, the number dependent upon the number of components making up the fluid mixture. For convenience three such tubes are shown for handling a three-component mixture. The force applying bar 28 of the valves works against a back platen 29 between which the tubing section 13 is positioned. The platen 29 is in turn mounted on a platen support pin 30 which moves back and forth in bearing 31 and is equipped with a stop 32 to limit its forward motion due to the action of spring 33 which is provided to assure closure of the tubing without excessive deformation under the action of the force applying bar 28. Each tubing section within the pump is kept in line and in proper relationship with the valve assembly by means of tubing 34 which as will be seen in FIG. 3 have a circular section 35 adapted to grip the tubing firmly and hold it in place.

The force applying bar 28 associated with the valve means is mounted on a bar support 38 which in turn is free to move within a bearing 39 attached to the front housing 40 of the valve and pump actuating section 24. Each of the bar supports is attached to a valve plunger link 42 which in turn is pivotly mounted on a cam arm assembly made up of arms 43 and 44. Arm 44 in turn is connected to cam follower 45 through pin 46. The desired programmed movement of the force applying bar 28 is achieved by the valve actuating cam 50 which is driven by cam shaft 51. Arms 44 are maintained in contacting relationship with the cam 50 through means of spring 52.

As mentioned previously cam 50 is so programmed that when inlet valve 26 is open fluid will flow by gravity into tube 12 and then into tubing section 13 which is that portion of the tubing section contained within the pump itself. With the closing of valve 26 and the opening of outlet valve 27, a pump displacer platen 57 is caused to move forwardly to force the fluid within tubing section 13 through outlet valve into tubing section 14 and hence into the manifold. The pump displacer platen 57 is actuated by displacer shaft 58 which moves within bearing 59 and which, through arm 60 and pin 61, is mechanically connected to eccentric 62.

The actual volume displacement and hence the quantity of any one fluid which is pumped at any one time is programmed and controlled by the displacement volume programming component 25. Programs for the various fluid components are readily interchangeable by the replacement of the fluid displacement programming component 25 as will be explained. This component is comprised of a pressure plate 68, (acting in the role of a cam follower) which is secured to bars 69. The movement of pressure plate 68 is guided in its back and forth travel by guide roll 71 which is mounted on shaft 72 which also serves as the mounting means for cam 70. Spring 74, fixed to pins 75, acts to keep the slide assembly bearing on the cam 70 while plate 76 serves as a guide for bars 69.

Figure 4:
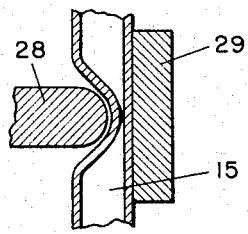
FIG. 4 illustrates in cross-section the means by which a valve operates to close off the flow of fluid.
Figures 5, 6:
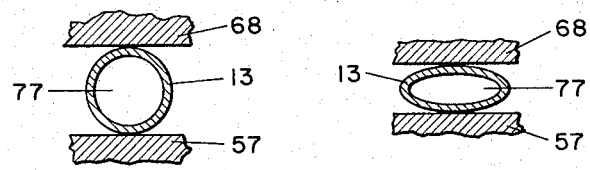
FIGS. 5 and 6 illustrate in cross-section the manner in which the fluid flow is controlled through the use of an elastomeric tubing by varying its cross-section.

The function of the cam assembly and manner in which it is used to program the displacement volume of each of the pumps (one for each tube) is best explained in terms of a description of the operation of one of these pumps. At the beginning of a cycle, outlet valve 27 is closed—i.e., force applying bar 28 serving as a valve plunger is in its forwardmost position thus in effect "pinching off" any fluid flow (see FIG. 4). Inlet valve 26 is open and the pumping displacer platen 57 is at the end of its stroke. Under these conditions a quantity of liquid is delivered to the tubing by gravity feed, the quantity being determined by the liquid displacement volume of tubing section 13. After the inlet valve 26 has closed and outlet valve 27 has opened the discharge stroke commences. The volume of fluid discharged is controlled by the positioning of pressure plate 68 which determines the extent to which the tube is squeezed. Thus for example if the cam is so designed to position plate 68 during the fluid discharge to just contact the tubing section 13, the tubing section will remain essentially circular in cross-section (FIG. 5) and the cross-sectional area 77 will remain unchanged and the displaced volume will be zero, thus cutting off that component into the final fluid mixture during a part of the programming cycle. If on the other hand, the cam is designed to position pressure plate 68 during fluid discharge to cause it to exert an external force on tubing section 13, then it will assume an ellipsoidal configuration (FIG. 6) and will have a displacement volume in proportion to the reduction of the cross-sectional area of the tube. In this manner, the separate cam associated with each tubing controls the displacement volume, and the amount of that component to be pumped into the manifold.

With the closing of inlet valve 26 and opening of outlet valve 27 the pump displacer platen 57 is moved forward until the tubing section 13 is collapsed in the programmed extent and fluid is pumped into manifold 11. Since each liquid component has a fluid displacement programming cam assembly the quantity of that component reaching the manifold is controlled and hence the composition of the fluid mixture in the manifold is regulated. Finally, pump displacer platen 57 is withdrawn, tubing 13 returns to its predetermined configuration, outlet valve 27 is closed and inlet valve 26 is opened to begin the cycle again.

The driving mechanism of the apparatus is so arranged as to permit rotation of shaft 51 which operates the valve and pumping displacer platen 57 at one speed and shaft 72 which operates the pressure plate 68 at another speed. Normally the apparatus will be driven by an electric motor or the like with a belt (not shown) attached to a drive pulley 80 which is adapted to drive main shaft 51 rotating in bearings 82 and 83. This means the valve cam 50 and arm 60 controlling the pumping are driven directly off main shaft 51. However, it will normally be desirable to drive program cam shaft 72 at a much slower speed. For this purpose there are supplied a reduction gear system comprising pinion gear 84 driving reduction gear 85 which is affixed to auxiliary shaft 86 positioned between bearing 83 and main housing wall 88. Also mounted on shaft 86 is a second pinion gear 89 which drives a second reduction gear 90 mounted on shaft 91 which rotates in bearing 92. It is the purpose of this driving mechanism to actuate a ratchet drive arm 94 which has a forked end 95 enclosing an eccentric (not shown) mounted on shaft 91. The forked end in its movement up and down on the eccentric actuates pawl 97, which is connected to the ratchet arm 94 through a pin 98. The pawl 97 in turn drives a ratchet wheel 100, moving it one notch for a predetermined number of revolutions of the main drive shaft 51. This ratchet wheel 100 rotates program shaft 72 (FIG. 2) which determines the position of the displacement volume programming cams mounted thereon as described previously. By proper choice of the throw of the eccentric in ratchet drive arm 94 it is possible to regulate the distance pawl 97 will travel and hence to vary the ratio of the speed of the movement of the pumping displacer platen 57 to the speed of the movement of the pressure plate 68. Shaft 72 terminates in a program knob 103 which permits the hand setting of the displacement volume program at any desired starting point as well as the manual shifting of a program during operation.

In keeping with known engineering practice it may be desirable to have associated with ratchet wheel 100 means for automatically switching off the driving motor at the end of a full cycle. Such means can take the form of a microswitch actuable by an indentation or the like in the surface of ratchet wheel 100. A slight movement of knob 103 could then be used to begin the cycle again.

As pointed out previously, it is possible to interchange displacement volume programs in the apparatus. In order to do this the main housing wall 88 has within it a slot 106 into which the entire displacement programming section may be inserted and held in place through the use of clamp knob 105. The replaceable volume programming section 25 in addition to the cam assemblies includes the ratchet drive arm 94, in ratchet wheel 100 and their attendant components. The programming cam assembly is supported by supports 107 which are attached above and below the assembly. The entire assembly is held in position by means of bolts 108 and 109 and mounted on a frame 110 which slides into slot 106.

In order to change a displacement volume program it is only necessary to unscrew clamp knob 105, release the tubing sections from the tube clamps 35, and withdraw the entire section from the apparatus. This of course does not interfere in any way with the sterile regime maintained in the tubing sections and hence it is possible to insert a new displacement volume program without changing the tubings or contaminating them.

It is of course to be understood that any number of tubings may be used depending upon the number of liquid components which are to make up the final liquid mixture. It is of course also within the scope of this invention to vary the diameter of the elastomeric tubing as well as the length of the tubing section 13 which is positioned within the pumps. Thus the apparatus of this invention provides a great deal of flexibility both with respect to the amount of liquid handled and the variations in liquid composition.

It will thus be seen that the objects set forth above, among those made apparent from the preceding description, are efficiently attained and since certain changes may be made in the above constructions without departing from the scope of the invention it is intended that all matter contained in the above description or shown in the accompanying drawings shall be interpreted as illustrative and not in a limiting sense.

It is also to be understood that the following claim is intended to cover all of the generic and specific features of the invention herein described and all statements of the scope of the invention which as a matter of language might be said to fall therebetween.

I claim:

An apparatus for controlling the flow rate and composition of a fluid stream, comprising in combination:

(a) a plurality of fluid reservoirs;
(b) a manifold adapted to receive a controlled flow of fluid from each of said fluid reservoirs;
(c) a fluid impermeable tubing communicating between each of said reservoirs and said manifold, said tubing being essentially circular in cross-section in the absence of any appreciable external force acting thereon and being formed of an elastomeric material of sufficient elasticity to allow it to be contracted with the application of external force and to return to a circular cross-section with the removal of said external force; and
(d) pumping means associated with a section of each of said tubings, comprising in combination:
  (1) a movable platen adapted to contact each of said tubing sections and in its motion to apply and release external force on said sections,
  (2) a pressure plate associated with each of said tubing sections and adapted with said movable platen to continuously program the cross-sectional configuration and hence the fluid displacement volume of each of said tubing sections positioned between said pressure plates and said movable platen,
  (3) inlet valve means positioned below said pressure plates and movable platen and outlet valve means positioned above said pressure plates and movable platen, said valve means comprising force applying means adapted to engage said tubing sections and apply sufficient external force to cut off fluid flow in said tubing,
  (4) tubing clamping means associated with said valve means and adapted to hold said tubing sections in alignment,
  (5) cam-driven actuating means associated with said valve means and adapted to alternately actuate the force applying means of said inlet valve means and said outlet valve means,
  (6) driving means adapted to cause said movable platen to apply said external force when said outlet valve means is open and to release said external force when said inlet valve is open, and
  (7) cam-driven actuating means associated with each of said pressure plates and adapted to effect the fluid displacement programming of each of said tubing sections; said cam-driven actuating means associated with said valve means and said driving means being mechanically connected to said cam-driven actuating means associated with said pressure plates through reduction gears, whereby said cam-driven actuating means associated with said pressure plates operate at a slower predetermined speed.

References Cited

UNITED STATES PATENTS

| | | | |
|---|---|---|---|
| 2,877,714 | 3/1959 | Sorg et al. | 103—149 |
| 2,922,379 | 1/1960 | Schultz | 103—148 |
| 3,055,551 | 9/1962 | Johnson | 103—149 |

FOREIGN PATENTS

| | | |
|---|---|---|
| 650,042 | 2/1951 | Great Britain. |

DONLEY J. STOCKING, *Primary Examiner.*

ROBERT M. WALKER, *Examiner.*

W. L. FREEH, *Assistant Examiner.*